(12) United States Patent
Ryan et al.

(10) Patent No.: US 8,447,443 B1
(45) Date of Patent: May 21, 2013

(54) SYSTEMS AND METHODS FOR PEAK-SEEKING CONTROL

(75) Inventors: John J Ryan, Tehachapi, CA (US); Jason L Speyer, Los Angeles, CA (US)

(73) Assignees: The United States of America as Represented by the Administrator of the National Aeronautics and Space Administration, Washington, DC (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 13/367,990

(22) Filed: Feb. 7, 2012

Related U.S. Application Data (60) Provisional application No. 61/499,249, filed on Jun. 21, 2011.

(51) Int. Cl.
*G05B 19/042* (2006.01)
*G06F 17/00* (2006.01)

(52) U.S. Cl.
USPC ............. 701/3; 701/480; 701/510; 340/992

(58) Field of Classification Search
USPC .................. 701/3, 480, 510; 340/992
See application file for complete search history.

(56) References Cited

U.S. PATENT DOCUMENTS

| | | | |
|---|---|---|---|
| 5,555,257 A | 9/1996 | Dent | |
| 5,594,941 A | 1/1997 | Dent | |
| 5,619,503 A | 4/1997 | Dent | |
| 5,631,898 A | 5/1997 | Dent | |
| 5,812,947 A | 9/1998 | Dent | |
| 5,848,060 A | 12/1998 | Dent | |
| 5,987,444 A | 11/1999 | Lo | |
| 6,157,811 A | 12/2000 | Dent | |
| 6,307,959 B1 | 10/2001 | Mandelbaum et al. | |
| 6,522,991 B2 | 2/2003 | Banaszuk et al. | |
| 7,172,897 B2 | 2/2007 | Blackburn et al. | |
| 7,203,555 B2 | 4/2007 | Ogunnaike et al. | |
| 7,650,181 B2 | 1/2010 | Freeman et al. | |
| 7,831,094 B2 | 11/2010 | Gupta et al. | |
| 7,917,332 B2 | 3/2011 | Waldock et al. | |
| 2002/0162317 A1 | 11/2002 | Banaszuk et al. | |
| 2004/0053290 A1 | 3/2004 | Terbrueggen et al. | |
| 2005/0238200 A1 | 10/2005 | Gupta et al. | |
| 2006/0160205 A1 | 7/2006 | Blackburn et al. | |

(Continued)

OTHER PUBLICATIONS

D. F. Chichka, J. L. Speyer, C. L. Fanti, and C-G Park. "Peak-Seeking Control for Drag Reduction in Formation Flight", AIAA Journal of Guidance, Control, and Dynamics, Sep.-Oct. 2006, pp. 1221-1230, v. 29, No. 5.

(Continued)

*Primary Examiner* — Mary Cheung
*Assistant Examiner* — Brian P Sweeney
(74) *Attorney, Agent, or Firm* — Mark Homer (57) ABSTRACT

A computerized system and method for peak-seeking-control that uses a unique Kalman filter design to optimize a control loop, in real time, to either maximize or minimize a performance function of a physical object ("plant"). The system and method achieves more accurate and efficient peak-seeking-control by using a time-varying Kalman filter to estimate both the performance function gradient (slope) and Hessian (curvature) based on direct position measurements of the plant, and does not rely upon modeling the plant response to persistent excitation. The system and method can be naturally applied in various applications in which plant performance functions have multiple independent parameters, and it does not depend upon frequency separation to distinguish between system dimensions.

9 Claims, 6 Drawing Sheets

U.S. PATENT DOCUMENTS

| | | | |
|---|---|---|---|
| 2007/0060785 | A1 | 3/2007 | Freeman et al. |
| 2007/0098600 | A1 | 5/2007 | Kayyem |
| 2008/0065267 | A1 | 3/2008 | Hong et al. |
| 2008/0242553 | A1 | 10/2008 | Kayyem |
| 2009/0057147 | A1 | 3/2009 | Kayyem |
| 2009/0125274 | A1 | 5/2009 | Waldock et al. |
| 2009/0240480 | A1 | 9/2009 | Baramov |
| 2010/0048242 | A1 | 2/2010 | Rhoads et al. |
| 2010/0160839 | A1 | 6/2010 | Freeman et al. |
| 2010/0221690 | A1 | 9/2010 | Freeman et al. |
| 2010/0221691 | A1 | 9/2010 | Freeman et al. |
| 2010/0222681 | A1 | 9/2010 | Freeman et al. |
| 2010/0222717 | A1 | 9/2010 | Freeman et al. |
| 2010/0222718 | A1 | 9/2010 | Freeman et al. |
| 2010/0268353 | A1 | 10/2010 | Crisalle et al. |
| 2010/0285981 | A1 | 11/2010 | Kayyem |
| 2010/0328682 | A1 | 12/2010 | Kotake et al. |
| 2011/0034176 | A1 | 2/2011 | Lord et al. |

OTHER PUBLICATIONS

W.R. Williamson, M. Abdel-Hafiz, I. Rhee, E.J. Song, J. Wolfe, D. Cooper, D.F. Chichka, and J.L. Speyer, "An Instrumentation System Applied to Formation Flight", IEEE Transactions on Control System Technology, Jan. 2007, pp. 75-85, v. 15, No. 1.

W.H. Moase, C. Manzie, and M.J. Brear, Newton-like extremum-seeking Part I: theory, Conference on Decision and Control, Shanghai, 2009.

W.H. Moase, C. Manzie, and M.J. Brear, Newton-like extremum-seeking Part II: simulations and experiments, Conference on Decision and Control, Shanghai, 2009.

Lei Guo, Estimating Time-Varying Parameters by the Kalman Filter Based Algorithm: Stability and Convergence, IEEE Transactions on Automatic Control. Feb. 1990, vol. 35. No. 2.

Speyer, J.L., et al., Extremum Seeking Loops With Assumed Functions, Proceedings of the IEEE Conference on Decision and Control. 2000.

Ryan, J J. & Speyer, J.L., Peak-Seeking Control Using Gradient and Hessian Estimates, 2010 American Control Conference, Jun. 30-Jul. 2, 2010, Marriott Waterfront, Baltimore, MD, USA.

H.-H. Wang and M. Krstic, "Optimizing bioreactors by extremum seeking." [Online]. Available: citeseer.ist.psu.edu/182943.html.

H. Wang, S. Yeung, and M. Krstic, "Experimental application of extremum seeking on an axial-flow compressor," 1998. [Online]. Available: citeseer.ist.psu.edu/wang98experimental.html.

D. Popovic, M. Jankovic, S. Magner, and A. Teel, "Extremum seeking methods for optimization of variable cam timing engine operation," IEEE Transactions on Control Systems Technology, vol. 14, No. 3, pp. 398-407, 2006.

C. Zhang and R. Ordonez, "Numerical Optimization-based Extremum Seeking Control of LTI Systems," Decision and Control, 2005 and 2005 European Control Conference. CDC-ECC'05. 44th IEEE Conference on, pp. 4428-4433, 2005.

K. Ariyur and M. Krstic, "Analysis and design of multivariable extremum seeking," American Control Conference, 2002. Proceedings of the 2002, vol. 4, 2002.

F. Najson and J. Speyer, "Extremum seeking loop for a class of performance functions," in 15th IFAC World Congress on Automatic Control, Barcelona, Spain, Jul. 2002.

M. Grewal and A. Andrews, Kalman Filtering: Theory and Practice Using MATLAB. Wiley, 2001.

M. J. Vachon, R. J. Ray, K. R. Walsh, and K. Ennix, "F\A-18 aircraft performance benefits measured during the autonomous formation flight project," in the AIAA Guidance, Navigation and Control Conference, 2002, pp. 2002-4491.

SYSTEMS AND METHODS FOR PEAK-SEEKING CONTROL

CROSS-REFERENCE TO RELATED APPLICATIONS

The present application claims priority to U.S. provisional patent application Ser. No. 61/499,249 filed on 21 Jun. 2011, which is incorporated herein by reference.

STATEMENT OF GOVERNMENT INTEREST

The invention described hereunder was made in the performance of work under a NASA contract, and is subject to the provisions of Public Law #96-517 (35 U.S.C. 202) in which the Contractor has elected not to retain title.

BACKGROUND a. Field of Invention

The invention relates to control systems suitable for use in a wide variety of applications and, more particularly, to a control system for controlling a physical object as a function of its movement.

b. Background of the Invention

Adaptive control is a technique in which a controller adapts to a controlled system having parameters that vary or are uncertain. For example, the mass of an aircraft will decrease in flight as a result of fuel consumption. An adaptive flight control systems can maintain optimum performance of such a system despite the changing conditions. Indeed, adaptive control is suitable for any real-time optimization of a physical device or system (i.e., a "plant") in which optimal control of the plant is a function of an independent parameter. This includes myriad real-world applications.

Many adaptive controller schema rely on software models that define a system's desired performance, such as for example, model predictive control "MPC." Model predictive control refers to a class of computer control algorithms that utilize an explicit process model to predict the future response of a plant. At each control interval an MPC algorithm attempts to optimize future plant behavior by computing a sequence of future manipulated variable adjustments. The first input in the optimal sequence is then sent into the plant, and the entire calculation is repeated at subsequent control intervals. United States Patent Application 20100268353 by Crisalle et al. shows systems and methods for predictive control that uses a mathematical model that describes the anticipated future values of the variables. U.S. Pat. No. 7,203,555 to Ogunnaike et al. discloses another MPC which generates a model prediction value (y) indicating how a system parameter of the plant is going to behave.

These and other MPCs rely on a priori information about time-varying parameters and/or a software model and it is consequently not possible for them to provide an accurate model in applications where a priori information does not exist or is not timely available. Under such circumstances, an "extremum seeking" or "peak-seeking" control schema is a more practical approach. Originally developed as a method of adaptive control for hard-to-model systems, peak-seeking controllers use measurements of input and output signals and dynamically search for the optimizing inputs. Thus, peak-seeking controllers optimize a control loop, in real time, to either maximize or minimize a function and do not require an a priori model.

There are various approaches to minimizing or maximizing a function by systematically choosing the values of real or integer variables from within an allowed set and, in general, peak seeking control methods can be divided into three categories: classical-gradient methods, parametric methods and nonlinear methods. Classical-gradient methods estimate the performance function gradient using classical-control techniques in a recursive approach that relies on gradient analysis.

Rudolph Kalman's work on control theory beginning in the late 1950s led to a seminal paper, Kalman, "A New Approach To Linear Filtering And Prediction Problems", Journal of Basic Engineering 82 (1): 35-45 (1960), and eventual widespread adoption of his Kalman filter in control systems across many diverse industries. The Kalman filter produces estimates of the true values of measurements and their associated calculated values by predicting a value, estimating the uncertainty of the predicted value, and computing a weighted average of the predicted value and the measured value. Specifically, the Kalman approach estimates the state at the current timestep from the previous timestep to produce an estimate of the state. This prediction is then combined with observation information to refine the state estimate. This improved estimate is termed the a posteriori state estimate.

To control simple linear time-invariant systems, Kalman filter are sometimes used in conjunction with controllers to provide system state estimates to the contoller that are more accurate estimates of the system state than the measured or calculated state parameters alone. At a given system state in a time invariant linear system, an applied input will always produce the same output regardless of when it is applied. A linear time invariant state-space system can take the form $$x_{k+1} = Ax_k + Bu$$

$$y = Cx_k$$

where A, B, and C are fixed matrices; x is a state vector; u is the system input; and y is the system output. In contrast, time-varying systems can be described by a set of linear differential equations with time-varying coefficients (where the state space matrices depend on time). In other words, A, B, and C become A(t), B(t), and C(t). The Kalman filter has also been applied to time-varying systems such as, for example, motion control systems. See, Introduction to Kalman Filtering and Its Applications, VI Workshop U.S. Army TACOM, Warren, Mich. (2004), which illustrates various discrete-time (time varying) Kalman filters for linear systems.

A Kalman filter estimates the values of the gradients (slopes) of the function, which estimated gradients are used as input for a controller. Linear constraints are assumed. The feedback loop continues, and states are adjusted until the gradient estimates go to zero. The gradient of the function (f) is defined to be a vector field having components that are the partial derivatives of f. That is:

$$\nabla f = \left( \frac{\partial f}{\partial x_1}, \ldots, \frac{\partial f}{\partial x_n} \right).$$

The function f is used to compute the predicted state from the previous estimate, and the only input to the Kalman filter is the performance-function f magnitude.

An example of a peak-seeking control solution using a time-invariant Kalman filter is disclosed in D. F. Chichka et al., "Peak-Seeking Control for Drag Reduction in Formation Flight", AIAA Journal of Guidance, Control, and Dynamics, v. 29, no. 5, pp.1221-1230 (September-October 2006). The Chichka et al. paper proposes peak-seeking control for precise positioning of two aircraft relative to one another in order to minimize drag. The value of the performance function is fed to a time-invariant Kalman filter, which is used to estimate the values of the gradients of the function.

A formation flight instrumentation system for the estimation of the relative position, velocity, and attitude between two moving aircraft using an onboard GPS system an inertial navigation sensor (INS) is disclosed in W. R. Williamson et al., "An Instrumentation System Applied to Formation Flight", IEEE Transactions on Control System Technology, v. 15, no. 1, pp. 75-85 (January 2007). An extended Kalman filter blends the outputs of each GPS/INS so as to maximize the accuracy of the relative state estimates as required for a control algorithm to reduce formation drag. The W. R. Williamson et al. reference demonstrates the estimation of the relative states of position, velocity and attitude between two moving bodies using GPS and an inertial measurement unit (IMU). Williamson et al. determines the point of maximum drag reduction employing a gradient search. However, there is no provision for measuring the independent parameters of the performance function, nor any algorithm for estimating the vortex or controlling the trailing vehicle to optimize its position relative to the vortex.

It is well-known that twice-differentiable objective functions can be optimized more efficiently by checking the second-order partial derivatives of a function. The matrix of second derivatives (the Hessian matrix) describes the local curvature of a function of many variables. For example, given the function $f(x_1, x_2, \ldots, x_n)$, the Hessian matrix of f is the matrix:

$$H(f) = \begin{bmatrix} \frac{\partial^2 f}{\partial x_1^2} & \frac{\partial^2 f}{\partial x_1 \partial x_2} & \cdots & \frac{\partial^2 f}{\partial x_1 \partial x_n} \\ \frac{\partial^2 f}{\partial x_2 \partial x_1} & \frac{\partial^2 f}{\partial x_2^2} & \cdots & \frac{\partial^2 f}{\partial x_1 \partial x_n} \\ \vdots & \vdots & \ddots & \vdots \\ \frac{\partial^2 f}{\partial x_n \partial x_1} & \frac{\partial^2 f}{\partial x_n \partial x_2} & \cdots & \frac{\partial^2 f}{\partial x_n^2} \end{bmatrix}.$$

Using both Hessians and gradients improve the rate of convergence. See, Schlegel, *Estimating The Hessian For Gradient-Type Geometry Optimizations*, Theoret. Chim. Acta (Berl) 66, 333-340 (1984). Moase et al. speculates that multivariable extremum-seeking (ES) schemes are possible using both gradient and Hessian, but also notes that the complexity will scale up. W. H. Moase, C. Manzie, and M. J. Brear, *Newton-Like Extremum-Seeking Part II: Simulations And Experiments*, Conference on Decision and Control, Shanghai (2009). Moase/Manzie also suggests that a fixed-gain Kalman filter (as opposed to a time-varying) Kalman filter can be used, and so their suggestion is implicitly confined to a linear time-invariant Kalman filter.

More often, state values are based on physical considerations that change over time, and a Kalman filter designed for such linear time varying conditions will provide better estimates. What is needed is a system and method for peak-seeking control including both hardware architecture and optimization software, the latter incorporating a linear time-varying Kalman filter to estimate both the performance function gradient (slope) and Hessian (curvature), from measurements of both independent (position measurements) and dependent parameters of the performance-function.

SUMMARY OF THE INVENTION

It is, therefore, an object of the present invention to provide a more efficient adaptive system and method for peak-seeking control based on measurements of both the independent and dependent parameters of the performance-function.

It is another object to provide peak-seeking optimization software that incorporates a linear time-varying Kalman filter.

It is another object to provide a linear time-varying Kalman filter that estimates both the performance function gradient (slope) and Hessian (curvature), based on measurements of both the independent and dependent parameters of the performance-function.

It is a more specific object to provide a more efficient system and method for peak-seeking control suitable for any application where real-time optimization of a physical device ("plant") is a function of its movement.

According to the present invention, the above-described and other objects are accomplished by providing a computerized peak-seeking control system and method for control of a physical plant as a function of an independent variable such as its position or movement. The system includes both computer hardware architecture, and peak-seeking optimization software based on a linear time-varying Kalman filter to estimate both the performance function gradient (slope) and Hessian (curvature). The system is herein disclosed in the context of a system for flight control but one skilled in the art will readily understand that the system may be readily adapted for controlling virtually any physical device as a function of its movement. Toward this end, the system uses position measurements directly and does not rely upon modeling of the physical device. A peek-seeking controller optimizes a control loop, in real time, to either maximize or minimize a function. The optimization software relies on a linear time-varying Kalman filter software module to estimate both the performance function gradient (slope) and Hessian (curvature).

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

DETAILED DESCRIPTION OF THE PREFERRED EMBODIMENT

The present invention is a more efficient system and method for peak-seeking control of any physical device or "plant 10," the goal of which is to optimize an independent parameter of the plant according to a performance function 40 in real time. The system incorporates a linear time-varying Kalman filter 60 to estimate either the performance function gradient (slope) alone or the gradient in combination with the Hessian (curvature) using direct measurements of one or more independent parameter(s) of the plant along with measurements of the dependent parameter(s) of the function.

Figure 1:
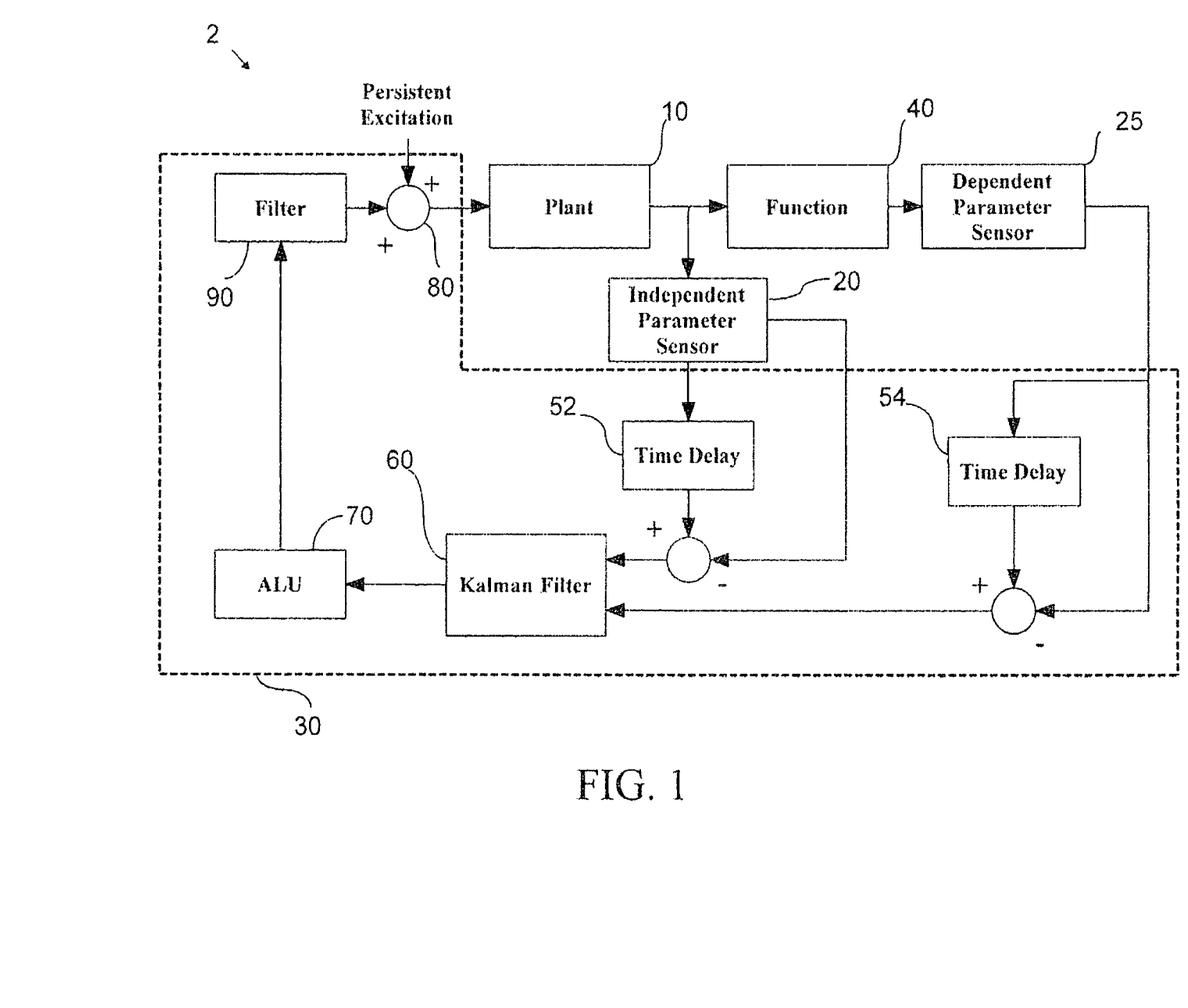
FIG. 1 is a block diagram of the system for peak-seeking control 2 according to an embodiment of the present invention.

FIG. 1 is a block diagram of a system for peak-seeking control 2 according to the present invention. The system 2 is designed for controlling one or more aspects of the plant 10 as a function of one or more independent parameters of its state in order to drive a dependent parameter of the plant 10 to a local extemum (either maximum or minimum as the case may be). The independent parameter of the plant 10 is a function of time x(t). The dependent parameter is a function, f(x(t)) of the independent parameters. The plant 10 may be any stable physical device, such as for example, an aircraft, for which optimal control as a function of, for example, its position relative to an object or terrain is desired. The independent parameter (actuator position) of the plant 10 is a function of time x(t), and the goal of the system 2 is to drive the independent parameter x(t) of plant 10 to the extremum of a performance function f(x(t)) in order to optimize the dependent parameter (e.g. aerodynamic drag). The system 2 uses one or more sensors 20 to directly measure the independent parameter (position) of the plant 10 to estimate the gradient and Hessian of the (drag) function. One or more additional sensors 25 are also utilized to directly or indirectly measure the magnitude of drag force (dependent parameter).

In the example in which the independent parameter is the position of plant 10, the positon measurements may be taken by any of a variety of conventional positon sensor(s) 20, either absolute position sensors or relative (displacement) sensors. Suitable position sensor(s) 20 may include inductive non-contact position sensors, potentiometers, linear variable differential transformers (LVDTs), capacitive transducers, eddy-current sensors, hall effect sensors, optical sensors, grating sensors, rotary encoders, piezo-electric transducers, GPS systems or the like. The dependent variable may be directly measured by similar sensors 25 or may be indirectly measured by correlation to a more easily observable value. For example, where the dependent variable is drag on an aircraft, the force required by the control surfaces to counter the rotational moment imposed on the aircraft may be measured and correlated to drag.

The balance of the system 2 is preferably implemented as software modules implicit in a programmable controller 30, and any suitable programmable logic controller (PLC), programmable controller, or digital computer as conventionally used for automation of processes will suffice. The programmable controller 30 maintains a synchronous operation at discrete clock iterations k and polls the sensor(s) 20 for measurement of the independent variable (e.g., position $x_k$) at each iteration. The controller 30 then calculates the difference between the current measured plant position $x_k$, and the previous position, $x_{k-1}$, for each iteration. The dependent variable (drag) performance function 40 f(x(t)) of the plant 10 is unknown. However, the magnitude of the performance function f(x) is measured by sensor(s) 25 such that the controller 30 also calculates the difference between the current function magnitude f($x_k$), and the previous iteration f($x_{k-1}$) at each iteration k. The time delay blocks 52, 54 included in FIG. 1 represent the change in time between iterations k (or time steps). The performance function 40 f(x(t)) provides a gradient (slope) and Hessian (curvature) that change as a function of position. The independent variable difference (change in position) and performance function magnitude difference (change in drag) at each new iteration k are input to a linear time-varying Kalman filter 60 software module, which estimates the current gradient $b_k$ and Hessian $M_k$ of the performance function 40 as described in more detail below.

At each time step k, Kalman filter 60 software takes the prior gradient $b_k^-$ and Hessian $M_k^-$ estimates of the performance function at the previous step k−1, or $b_k^-$ and $M_k^-$, respectively. These prior estimates are termed a priori state estimates because, although they are estimates of the state at the current timestep, they do not include parameter observation information from the current timestep k. However, Kalman filter 60 then makes a new estimate of the gradient $b_k$ and Hessian $M_k$ by combining the a priori state estimate with the current observation information (performance function coordinate and magnitude measurements), providing "a posteriori" estimates. This is done recursively for each timestep k.

Next, the a posteriori gradient $b_k$ and Hessian $M_k$ are input to an arithmetic logic unit (ALU) 70, which complies the a posteriori gradient and Hessian estimates to form a position command, $x_c = b_k M_k^{-1}$ to drive the plant 10 toward the performance function 40 extremum. Preferably, a filter 90 smoothes and scales the position command $x_c$ to avoid large step commands which can create unwanted large and/or abrupt plant 10 movements. The smoothed and/or scaled position command $x_c$ is then combined at modulator 80 with the persistent excitation signal (PE) to provide a control signal to the plant 10. This ensures observability of the performance function 40. In operation, initial movement of the system 2 is based on an arbitrary initial position, and during continuous operation the system 2 will optimize and maintain optimal plant 10 control based on its movement. The process continues to improve the extremum estimate and drive the plant 10 to the extremum position.

It should be apparent from the foregoing that the system 2 uses independent variable (e.g. position) and dependent variable (e.g., drag) measurements directly to estimate the gradient and Hessian at Kalman Filter 60 without the need to model or otherwise know the performance function. To accomplish this the system 2 requires the use of a particular linear time-varying Kalman filter 60 software module which will now be described in detail.

Kalman Filter Design

Performance function gradient $b_k$ and Hessian $M_k$ are estimated using a linear time-varying Kalman filter 60 whose states consist of elements at the current position. This is accomplished by parameterizing the performance function f(x) using first- and second-order terms of a Taylor series expansion. Consider the Taylor series expansion of a performance function f(x) about $x_k$:

$$f(x) \approx f(x_k) + b_{x_k}^T(x - x_k) + \frac{1}{2}(x - x_k)^T M_{x_k}(x - x_k) + o(x - x_k) \quad (1)$$

where $b_{x_k}$ is the gradient at $x_k$, $M_{x_k}$ is the Hessian at $x_k$, and o represents higher order terms. Evaluating (1) at $x_{k-1}$ and rearranging yields $$\Delta f_k = b_k^T \Delta x_k + \frac{1}{2} \Delta x_k^T M_{x_k} \Delta x_k \quad (2)$$

where $\Delta x_k = x_{k-1} - x_k$ and $\Delta f_k = f(x_{k-1}) - f(x_k)$.

The higher-order terms o may be dropped by assuming the performance function is adequately modeled as a quadratic function at any particular position. For simplicity, we restrict ourselves to a two-dimensional case. Denote the positions in the two dimensions at time k as $x_{1_k}$ and $x_{2_k}$. Denote the corresponding gradients as $b_{1_k}$ and $b_{2_k}$ and the corresponding Hessian as $$M_k = \begin{bmatrix} M_{11_k} & M_{12_k} \\ M_{12_k} & M_{22_k} \end{bmatrix}.$$

Further denote $$\Delta x_{1_k} = x_{1_{k-1}} - x_{1_k}$$

$$\Delta x_{2_k} = x_{2_{k-1}} - x_{2_k}$$

Equation (2) may then be written as $$\Delta f_k = \begin{bmatrix} \frac{1}{2}\Delta x_{1_k}^2 \\ \frac{1}{2}\Delta x_{2_k}^2 \\ \Delta x_{1_k} \Delta x_{2_k} \\ \Delta x_{1_k} \\ \Delta x_{2_k} \end{bmatrix}^T \begin{bmatrix} M_{11_k} \\ M_{22_k} \\ M_{12_k} \\ b_{1_k} \\ b_{2_k} \end{bmatrix}. \quad (3)$$

Equation (3) implies that a parameter estimation technique may be used to estimate the gradient and Hessian. Since the gradient and Hessian may change with x, and measurements of $\Delta x_{1_k}$, $\Delta x_{2_k}$ and $\Delta f_k$ may be noisy, a Kalman filter is a suitable estimator. The Kalman filter states are chosen to be:

$$\zeta_k = \begin{bmatrix} M_{11_k} \\ M_{22_k} \\ M_{12_k} \\ b_{1_k} \\ b_{2_k} \end{bmatrix}.$$

This allows the measurement equation of a linear time-varying Kalman filter to take the form $$\Delta f_k = H_k \zeta_k + v_k \quad (4)$$

where $$H_k = \begin{bmatrix} \frac{1}{2}\Delta x_{1_k}^2 \\ \frac{1}{2}\Delta x_{2_k}^2 \\ \Delta x_{1_k} \Delta x_{2_k} \\ \Delta x_{1_k} \\ \Delta x_{2_k} \end{bmatrix}^T$$

and $v_k$ represents a zero-mean Gaussian white-noise process with variance $V_k$. The gradient and Hessian are modeled as a Brownian noise process since they may change in an unknown manner with x. The Kalman filter process equation is, therefore, given by $$\zeta_{k+1} = I\zeta_k + w_k \quad (5)$$

where I is a 5×5 identity matrix and $w_k$ represents a zero mean Gaussian white-noise process with variance $W_k$. The linear time-varying Kalman filter 60 is therefore implemented with the following equations:

$$\hat{P}_{k+1} = \overline{P}_k + W_k \quad (6a)$$

$$\zeta_{k+1} = \zeta_k + \overline{P}_k H_k^T V_k^{-1} (\Delta f_k - H_k \zeta_k) \quad (6b)$$

$$\overline{P}_k = (\hat{P}_k^{-1} + H_k^T V_k^{-1} H_k)^{-1} \quad (6c)$$

where $\overline{P}$ is the state covariance matrix, $\hat{P}$ the predicted state covariance matrix, and $\zeta$ the state vector. The values of $W_k$ and $V_k$ are used as tuning parameters. Typically, initial guesses of $W_k$ and $V_k$ are based on previously-obtained measurements of the noise or on a noise model. A trial-and-error process is then used to adjust the values in order to improve the estimates. The linear time-varying Kalman filter 60 can be implemented using commercially available versions of MATLAB software from MathWorks® as explained in R. Brown et al., Introduction to Random Signals and Applied Kalman Filtering: With MATLAB Exercises and Solutions, Wiley (1997) and M. Grewal and A. Andrews, *Kalman Filtering: Theory and Practice Using MATLAB*, Wiley (2001). It should be noted that equations 6a, 6b and 6c may be implemented in a variety of forms including forms which do not require an inverse-operation which are preferably avoided in a production-system.

The Kalman filter may be expanded to include N measurements at each iteration k. For this we define $$\Delta f_{k,n} = f(x_{1_k}, x_{2_k}) - f(x_{1_{k-n}}, x_{2_{k-n}}) \quad (7a)$$

$$\Delta x_{1_{k,n}} = x_{1_k} - x_{1_{k-n}} \quad (7b)$$

$$\Delta x_{2_{k,n}} = x_{2_k} - x_{2_{k-n}} \quad (7c)$$

and $v_{k,n}$ as the corresponding process noise. The index n takes values between 1 and N. The expansion is implemented by modifying the measurement equation (4) as $$\begin{bmatrix} \Delta f_{k,1} \\ \Delta f_{k,2} \\ \vdots \\ \Delta f_{k,N} \end{bmatrix} = H_k \zeta_k + \begin{bmatrix} v_{k,1} \\ v_{k,2} \\ \vdots \\ v_{k,N} \end{bmatrix}. \quad (8)$$

where $$H_k = \begin{bmatrix} \frac{1}{2}\Delta x_{1_{k,1}}^2 & \frac{1}{2}\Delta x_{2_{k,1}}^2 & D_{k,1} & \Delta x_{1_{k,1}} & \Delta x_{2_{k,1}} \\ \frac{1}{2}\Delta x_{1_{k,2}}^2 & \frac{1}{2}\Delta x_{2_{k,2}}^2 & D_{k,2} & \Delta x_{1_{k,2}} & \Delta x_{2_{k,2}} \\ \vdots & \vdots & \vdots & \vdots & \vdots \\ \frac{1}{2}\Delta x_{1_{k,N}}^2 & \frac{1}{2}\Delta x_{2_{k,N}}^2 & D_{k,N} & \Delta x_{1_{k,N}} & \Delta x_{2_{k,N}} \end{bmatrix}$$

and $D_{k,n} = \Delta x_{1_{k,n}} \Delta x_{2_{k,n}}$. The process equation remains as it is shown in equation (5). The Kalman filter 60 is implemented as shown in equation (6) with $$\Delta f_k = \begin{bmatrix} \Delta f_{k,1} \\ \Delta f_{k,2} \\ \vdots \\ \Delta f_{k,N} \end{bmatrix}$$

and $$V_k = \begin{bmatrix} v_{k,1} & 0 & \cdots & 0 \\ 0 & v_{k,2} & \cdots & 0 \\ \vdots & \vdots & \ddots & \vdots \\ 0 & 0 & \cdots & v_{k,N} \end{bmatrix}$$

where $V_{k,n}$ is the variance of $v_{k,n}$.

The number of measurements is used as a tuning parameter. A larger N increases the observability and tolerance to noise by providing an over-determined set of equations. It also increases the area of the performance function to which the gradient and Hessian are fit. For a performance function in which the Hessian changes as a function of position, a too-large N may slow convergence.

The above-described Kalman Filter 60 design for estimating the performance function gradient $b_k$ and Hessian $M_k$ has been implemented with a simple one-input one-ouput problem and more complex two-input one-ouput problem both described below.

Example #1

Simple One-Input One-Ouput Problem

The following is a one-dimensional example of the method described above. The peak-seeking controller operates on the signals (z, x, y) and ensures that x(t) converges to $x_{min}(\theta^*)$. The system under consideration is described by $$y = Ay + Bu+; \ y(0) = yo$$

$$x = Cy$$

$$z = F(x;\theta^*)$$

The continuous linear plant model is given by:

$$A = \begin{bmatrix} 0 & 1 & 0 \\ 0 & 0 & 1 \\ -5 & -9 & -5 \end{bmatrix} \ B = \begin{bmatrix} 0 \\ 0 \\ 1 \end{bmatrix} \ C = [1 \ 0 \ 0]$$

The foregoing system is described in more detail in F. Najson and J. Speyer, "Extremum seeking loop for a class of performance functions," 15th IFAC World Congress on Automatic Control, Barcelona, Spain, July 2002. For present purposes the performance function is chosen to be $f(x)=(\cos(x/8.4)+1.5)(x/6-0.4)^2$. Note that this performance function provides a gradient and Hessian that change as a function of position. The performance function magnitude measurements were corrupted with Gaussian distributed noise with a standard deviation of 0.1. There was no noise on the position measurements.

Figure 2:
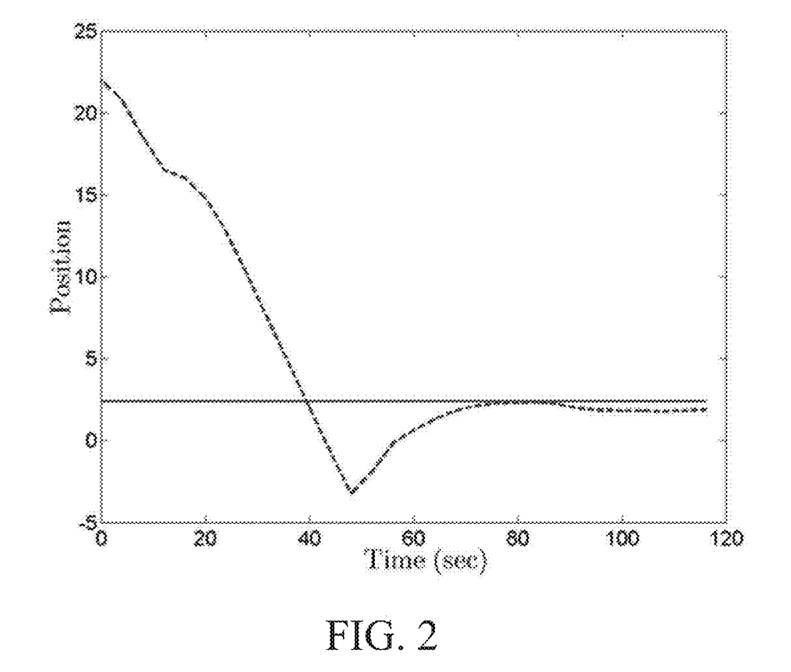
FIG. 2 is a graph of plant position as a function of time for the system of FIG. 1, illustrating how convergence reaches the performance function minimum in approximately 80 seconds.
Figure 3:
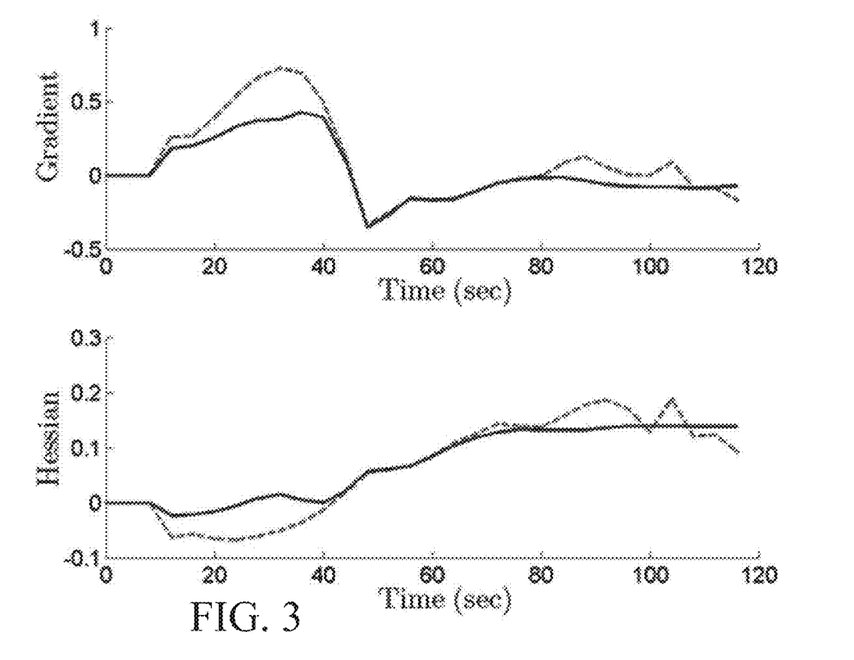
FIG. 3 illustrates the gradient and Hessian estimates derived by the Kalman Filter of FIG. 1 in which the dashed line is Kalman filter estimates and the solid line is true gradient and Hessian.

The system was implemented in a 1.0 Hz fixed-step discrete simulation. The Kalman filter 60 (FIG. 1) operated at 0.25 Hz. The matrix $H_k$ in equation (8) above was selected to have ten rows. The other elements of equation (8) were selected to be of compatible size. The command filter was set to 1 and the Persistent Excitation at modulator 80 from FIG. 1 is set to 0. An initial command was provided to the plant 10. As the system 2 responded to the command, position and performance function magnitude measurements were provided to the Kalman filter 60, which produced estimates of the gradient and Hessian. The estimates of the gradient and Hessian were combined at ALU 70 to provide the offset signal $x_c = b_k M_k^{-1}$, to command the plant toward the local extremum. As the system approached the extremum, $f_k$ became small and was buried in noise, leading to poor estimates. Typically, the Hessian estimate suffers more than the gradient estimates. To compensate for this, the Kalman Filter 60 switches between a steepest-descent optimization approach and a Newton approach. Steepest (or gradient) descent is a well-known gradient optimization algorithm capable of approximating solutions of complex functions, but it is slow. The Newton approach is a well-known quadratic optimization algorithm for minimizing a function that uses curvature information to take a more direct route. The Newton approach is faster but requires more computer memory overhead. The present Kalman Filter 60 uses a hybrid approach, using steepest descent until the inverse of the Hessian matrix, or error covariance Matrix $\sigma(P_k)$ is very small, below a switching threshold. The switching threshold is a tuning parameter and may be quantitatively selected by trial and error. The inventors have successfully used thresholds of $\sigma(P_k)=0.005$ to 6, though any suitable threshold may be used as a matter of design choice. Thus, for Example #1 (Simple One-Input One-Ouput Problem), the switching threshold was set at $\sigma(P_k)=0.005$. When the smallest singular value of the Kalman filter 60 error covariance $\sigma(P_k) \leq 0.005$, a Newton approach was used. When $\sigma(P_k) > 0.005$, a steepest-descent approach was used. In Example #2 below (Two-Input One-Ouput Problem), the switching threshold was set at $\sigma(P_k)=6$. Consequently, when the smallest singular value of the Kalman filter 60 error covariance $\sigma(P_k) \leq 6$, a Newton approach was used. When $\sigma(P_k) > 6$, a steepest-descent approach was used. Resulting plant 60 position as a function of time is presented as a dotted line in FIG. 2. The performance function minimum is depicted by a solid line, and it can be seen that plant 60 position reaches the performance function minimum in approximately 80 seconds, after which noisy estimates cause the plant to deviate from the minimum. The gradient and Hessian estimates are shown in FIG. 3 (dashed line is Kalman filter estimates, solid line is true gradient and Hessian.). The system required three measurements before beginning estimation, thus, the figures show the first non-zero estimate at 12 seconds. It is apparent that the estimations began to suffer once the system neared the minimum. Nevertheless, the gradient and Hessian estimates track the true values well and the system quickly reaches the extremum.

Example #2

Two-Input One-Ouput Problem

A two-dimensional example is presented, and this is more suitable for veicle control in the context of a two-aircraft formation in which the peak-seeking control system 2 is adapted to minimize drag (this is a known application, See, D. F. Chichka et al., supra). It is assumed that a lead aircraft flies in a straight-and-level path. This allows the vortex generated by the lead aircraft to be modeled as static maps of induced drag coefficient and rolling moment on a trailing aircraft as a function of lateral and vertical relative position. The induced drag coefficient map is used as the performance function 40 for plant 60. The magnitude of the rolling moment map for any given position is used as a disturbance input to the trailing aircraft model. The maps were generated using a vortex-lattice method with the trailing aircraft wingtip positioned inside the leading aircraft wingtip vortex. For each position of the map, the aircraft was first trimmed for straight-and-level flight and then the induced drag coefficient and rolling moment were calculated. It is assumed that the vortex changes little with respect to relative longitudinal spacing.

The trailing aircraft was modeled with an 11-state, 4-input, 10 Hz discrete state-space model. The modeled states are body-axis vertical, lateral, and longitudinal velocities; roll, pitch, and yaw angles; roll, pitch, and yaw rates; and inertial axis lateral and vertical relative positions between aircraft. The inputs are elevator deflection, aileron deflection, rudder deflection, and thrust. The effects due to a changing induced drag coefficient were not modeled. Normally distributed random noise with a standard deviation of 0.001 was superimposed on the induced drag coefficient performance function magnitude. In addition, normally distributed random noise with a standard deviation of 0.012 meter is superimposed on the position measurements.

Figure 4:
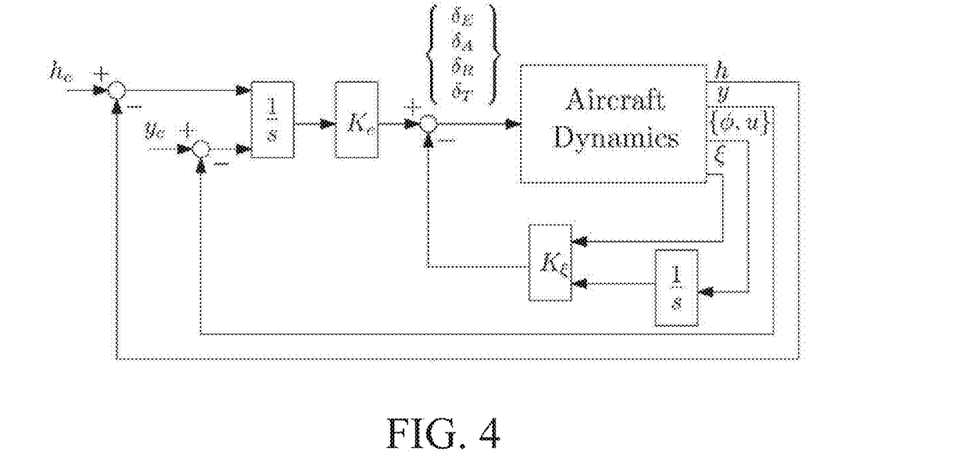
FIG. 4 is a schematic block diagram of an inner loop control system for plant (aircraft) stabilization prior to parameter optimization and peak seeking.

In order to first stabilize the plant 10 (aircraft), an inner-loop control system, as depicted in FIG. 4, is utilized within the plant (aircraft) to interface with the plant controls. The inner loop control system is not a necessary element of the present invention but is described here for the sake of completeness within the example. The primary goal of the inner-loop control system is to move the trailing aircraft to track relative vertical and lateral position commands between the leading and trailing aircraft. The secondary goal is to minimize roll angle to ensure the trailing aircraft wing remains in the vortex during lateral movement. The third goal is to maintain a constant relative longitudinal velocity to prevent the trailing aircraft from slowly drifting out of formation. In order to meet all three goals, an inner-loop control system was designed which penalizes roll angle and change in longitudinal velocity. The system translates relative lateral and vertical position commands into commands for elevator, rudder, aileron, and thrust. A conventional time-varying linear quadratic regulator (LQR) tracking controller was selected for construction of the control system. The aircraft model was augmented with integral states of the lateral position error, vertical position error, longitudinal velocity command, and roll angle. Controller gains were computed by minimizing the standard LQR cost function $$\int_0^\infty x^T Q x + u^T R u \, dt \quad (9)$$

where Q and R are designer selected weightings on the states, x, and inputs, u, respectively. The resulting gains were used in the LQR tracking control system via the interconnections shown in FIG. 4, in which h represents vertical relative position, y lateral relative position, $\Phi$ roll angle, and u longitudinal velocity. Vertical, lateral, and longitudinal velocities; roll, pitch, and yaw angles; and roll, pitch, and yaw rates are contained in $\xi$. Elevator deflection is represented by $\delta_E$, aileron deflection by $\delta_A$, rudder deflection by $\delta_R$, and thrust by $\delta_T$. Control gains on the aircraft states are represented by $K_\xi$, and control gains on the errors by $K_e$. The subscript c on the loop inputs indicates a command to the system.

The Kalman Filter 60 design is similar to that discussed in Example 1 above, but was chosen to iterate at 0.1 Hz to allow the aircraft to travel some distance between iterations. Measurements were taken at 10 Hz in between the iterations and averaged to form $f_{k,n}$, $x_{1_{k,n}}$ and $\Delta x_{2_{k,n}}$ of equations (7a-c). The Kalman filter 60 rate was used as a tuning parameter and again selected by trial and error. The matrix $H_k$ in equation (8) was selected to have 15 rows (N=15). The other elements of equation (8) were selected to be of compatible size.

A persistent excitation was chosen as a 3 rad/sec 0.7 meter sinusoidal signal, and modulator 80 modulation comprised superimposing persistent excitation on the relative-position command $x_c = b_k M_k^{-1}$ to drive the plant 10 toward the performance function 40 extremum. This allowed N values of $f_{k,n}$, $x_{1_{k,n}}$ and $\Delta x_{2_{k,n}}$ to be distributed over a full excitation period. The command filter 70 was chosen to be a 10 Hz integrator, Filt=0.1/(z−1). This resulted in a ramping position command in place of the step command generated by the 0.1 Hz Kalman filter 60 estimates. In addition, the system 2 was again implemented to switch between a steepest-descent and a Newton approach using a threshold $\sigma(P_k)=6$ as described above. The switching threshold was again used as a tuning parameter and selected by trial and error.

Figure 5:
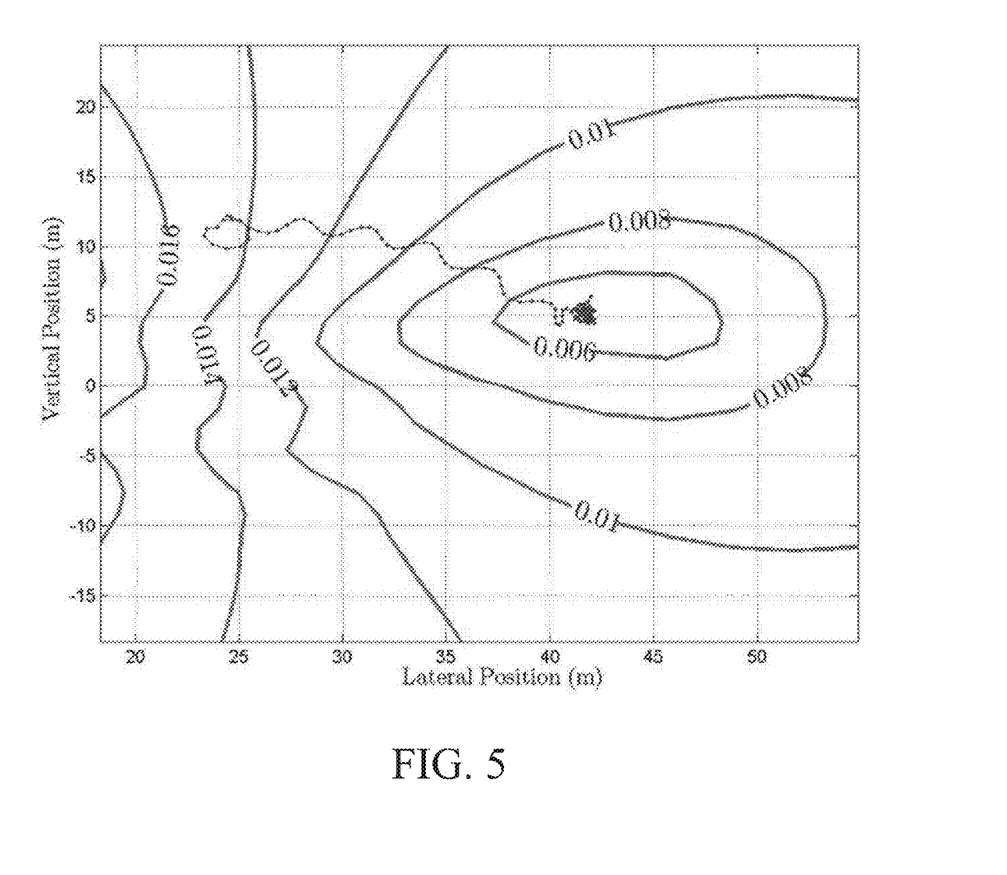
FIG. 5 depicts the path of an aircraft during a peak-seeking simulation.

With reference to FIG. 5, the system was tested by simulation in which the trailing aircraft was initially positioned to the left and above the leading aircraft right wingtip vortex core. FIG. 5 depicts the path the aircraft followed during the peak-seeking simulation. The contours represent induced drag coefficient. The system was initially commanded to trace a 0.7 meter radius circle to generate initial gradient and Hessian estimates. It was then allowed to move toward the minimum. The system primarily moved orthogonally through the contours of the plot as it moved to the minimal location. The system reached the local minimum in 300 seconds.

Figure 6:
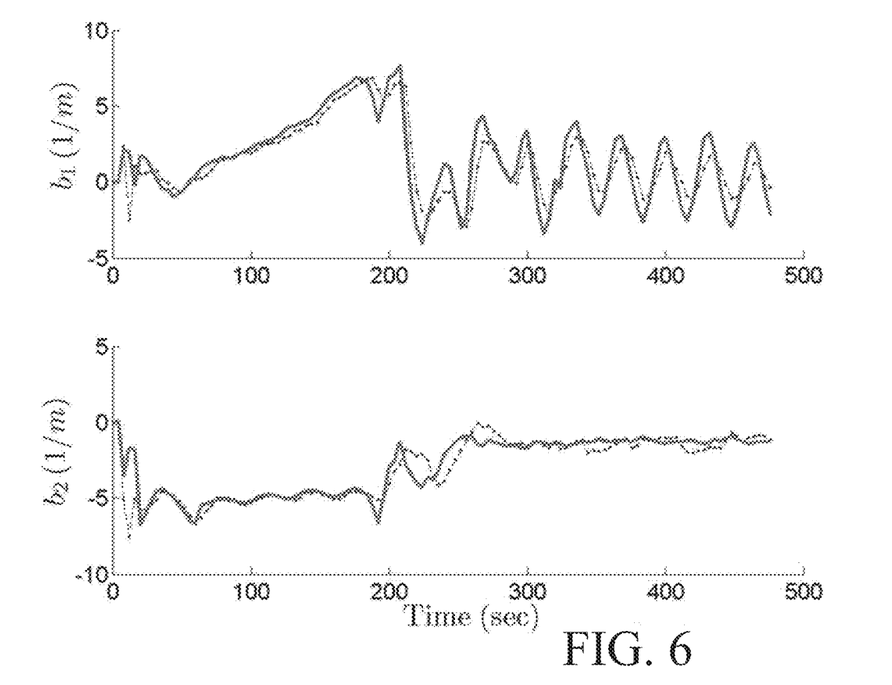
FIGS. 6 and 7 show the gradient and Hessian estimates, respectively, as a function of time for the simulation of FIG. 5.
Figure 7:
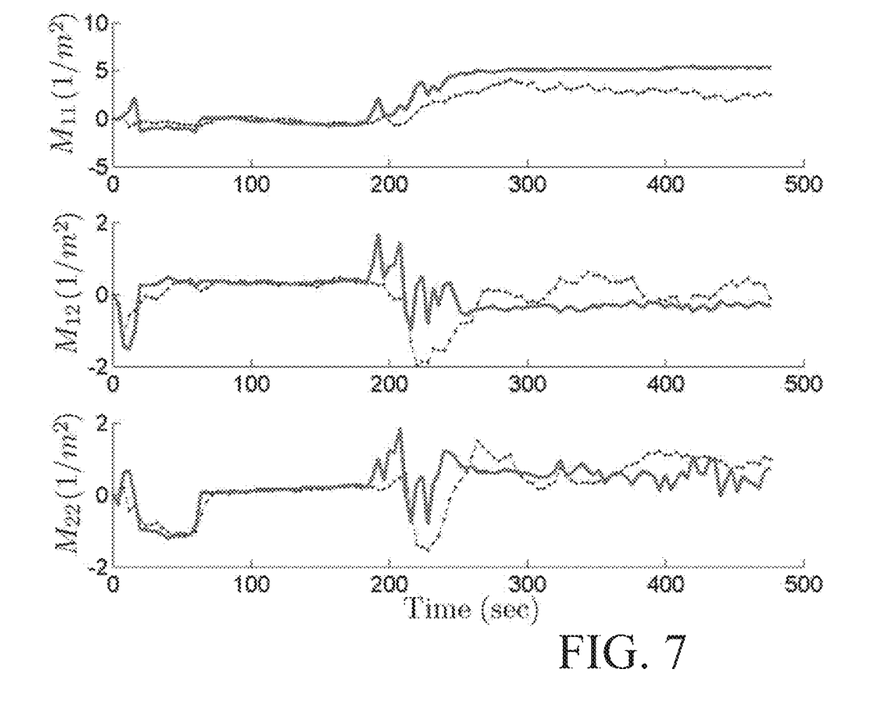

FIGS. 6 and 7 show the gradient and Hessian estimates during the simulation as a function of time. The solid lines in the figures represent the true gradient and Hessian while the dashed lines represent the estimates at each Kalman filter iteration. The gradient estimate approximates the true gradient well over the length of the entire simulation, as shown in FIG. 6. However, the Hessian estimate illustrated in FIG. 7 was less accurate.

Figure 8:
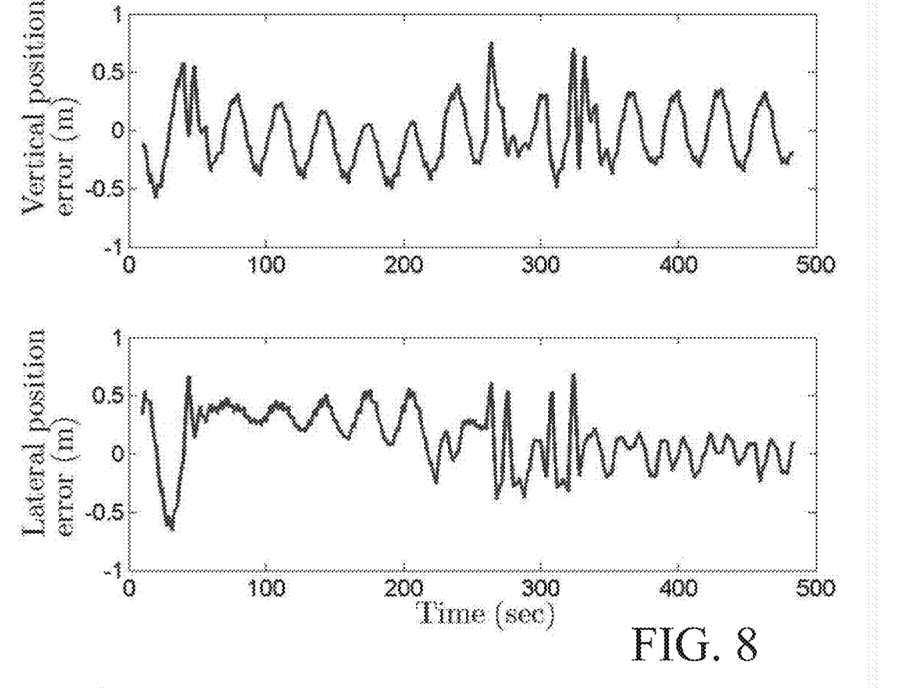
FIG. 8 is a graphical plot of the error between position commands and the aircraft response for the simulation of FIG. 5.

The error between position commands and the aircraft response is depicted in FIG. 8. The error never exceeds 0.8 meters.

Figure 9:
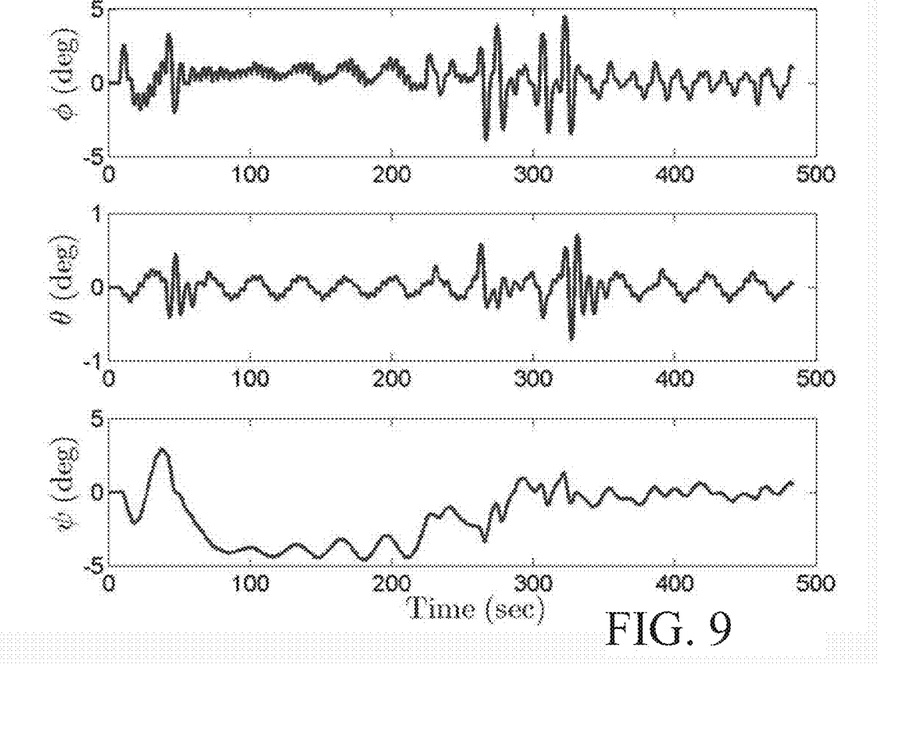
FIG. 9 is a graphical plot of the aircraft Euler angles for the simulation of FIG. 5.

The aircraft Euler angles are depicted in FIG. 9. The aircraft angles stay within reasonable values, never exceeding 5 degrees. The high-frequency oscillatory appearance of the angles is due to non-smooth commands being provided to the aircraft, and these could likewise be smoothed by adjusting command filter 70. The slower-period oscillations are due to the excitation. The roll and yaw angles share the task of moving the aircraft laterally. By changing the weightings contained in R of the inner-loop LQR cost function (equation (9), surface movements can be tuned to use more roll or yaw angle.

Figure 10:
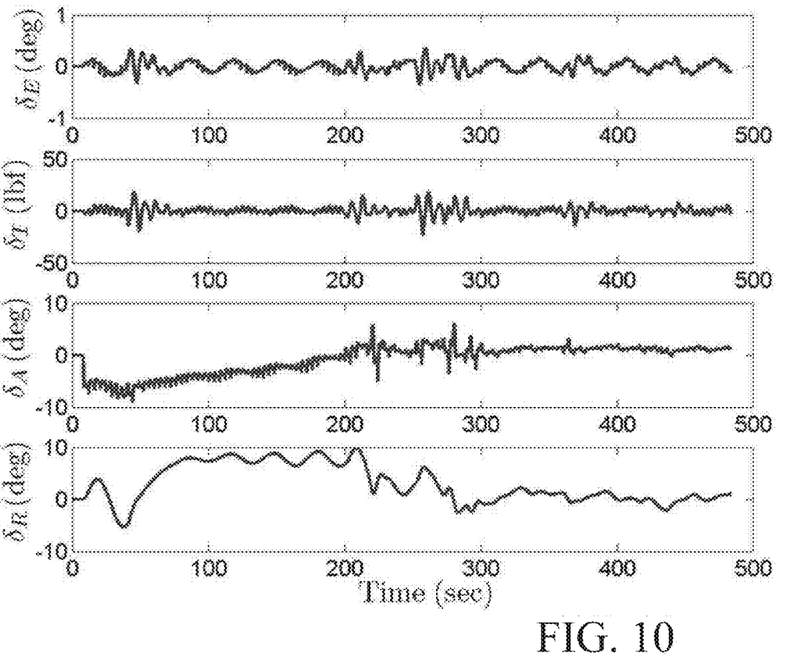
FIG. 10 is a graphical plot of the aircraft surface deflections for the simulation of FIG. 5.

The aircraft surface deflections are displayed in FIG. 10. As with the Euler angles, the high-frequency oscillation is due to the non-smooth commands to the aircraft and the slower oscillation is due to the excitation. Aileron deflection goes to ten degrees and rudder deflection goes to five degrees when the aircraft is tracing the initially-commanded circle. The simulation ends with all surface deflections except aileron near zero. Aileron deflection remains at three degrees because the aileron continues to counteract the vortex-induced rolling moment. This example amply demonstrates the application of the method to a two-input one-output problem.

One skilled in the art will readily understand that the method can be expanded to problems with larger numbers of inputs and/or outputs, albeit the estimation problem then demands more complexity and a larger number of measurements.

In addition, the Hessian matrix of second derivatives must be positive definite and hence invertible to compute the variance matrix, and invertible Hessians do not exist for some data sets and models, in which case the foregoing system may fail. One skilled in the art should understand that modification to the Kalman filter design used herein may eliminate the required inverse of the Hessian and avoid such issue.

In all such cases a computer application of the time-varying Kalman filter to the peak-seeking problem provides the minimum variance achievable of the gradient and Hessian estimates. Other methods must deal with noise in an ad-hoc fashion because it is not considered in the algorithm development. Moreover, the present system measures the independent parameters (independent variables that can be adjusted by the controller) and uses them directly in the time-varying Kalman filter with the time-varying H matrix displayed above. Other methods can only infer the values of the independent parameters.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A system for controlling a plant in order to maximize performance of a user selected dependent parameter of said plant in accordance with an unknown performance function $f(x(t)$, which is a function of an independent parameter x over time t, comprising:

at least a first sensor in operative relation with said plant to sense said independent parameter thereof;

at least a second sensor in operative relation with said plant to sense said dependent parameter thereof;

a programmable controller, said programmable controller in communication with said first sensor for measuring a value of said independent parameter of said plant at discrete time increments k and in communication with said second sensor for measureing a value of said dependent parameter at said time increments, and for controlling said system in accordance therewith, said programmable controller comprising a processor and a modular computer program, said modular computer program including a plurality of software modules for outputting a control signal for controlling said plant as a function of said independent parameter, said plurality of software modules further comprising a first module for calculating a difference between a current value of said independent parameter of said plant $x_k$ and a previous value of said independent parameter $x_{k-}$, a second module for calculating a difference in magnitude between a current value of said dependent parameter $f(x_k)$ and a previous value of said independent parameter $f(x_{k-1})$, a third module comprising a linear time-varying Kalman filter for inputting said calculated independent parameter difference and dependent parameter difference for estimating a gradient and Hessian of said performance function there from, a fourth module for estimating a extremum maximum or minimum of said performance function $f(x(t))$ based on said estimated gradient and Hessian, and for outputting a command to drive the independent parameter of said physical object toward the performance function extremum; and a modulator in operative communication with said physical object for combining a persistant excitation signal in accordance with said command and for outputting a control signal to said plant.

2. The system for controlling a plant according to claim 1, further comprising a filter in communication with said modulator for smoothing said command.

3. The system for controlling a plant according to claim 1, wherein said plant is an aircraft, said independent parameter is a position of said aircraft and said dependent parameter is aerodynamic drag on said aircraft.

4. A method for generating a control signal for controlling a plant having an associated but unknown performance function $f(x(t))$, comprising the steps of:

measuring an independent parameter x(t) of said plant at discrete time increments k;

measuring a user selected dependent parameter $f(x(t))$ of said plant at discrete time increments k;

calculating a difference between a current value of said independent parameter of said plant $x_k$ and a previous value $x_{k-1}$;

calculating a difference in magnitude between a current value of said dependent parameter $f(x_k)$ and a previous value $f(x_{k-1})$;

inputting said calculated difference in said independent parameter and difference in said dependent parameter to a linear time-varying Kalman filter and estimating a gradient and Hessian of said performance function, estimating a extremum maximum or minimum of said performance function $f(x(t))$ based on said estimated gradient and Hessian;

outputting a command signal based on said estimated extremum to drive the independent parameter of the plant toward the performance function extremum;

combining a persistant excitation signal in accordance with said outputted command signal; and outputting said modulated persistant excitation signal as a control signal to said plant for control thereof.

5. The method for generating a control signal for controlling a plant according to claim 4, further comprising a step of filtering said command signal to smooth it.

6. The method for generating a control signal for controlling a plant according to claim 4, wherein said plant is an aircraft, said independent parameter is a position of said aircraft and said dependent variable is aerodynamic drag on said aircraft.

7. A computer program stored on computer readable media at a computer for controlling a user defined dependent parameter of a plant as a function of an independent parameter in accordance with the steps of:

measuring the independent parameter of said plant at discrete time increments k;

calculating a difference between a current value of said independent parameter of said plant $x_k$ and a value at a previous time increment $x_{k-1}$;

calculating a difference in magnitude between a current value of said dependent parameter $f(x_k)$ and a value at a previous time increment $f(x_{k-1})$;

inputting said calculated difference in independent parameter and difference in dependent parameter to a linear time-varying Kalman filter and estimating a gradient and Hessian of said performance function, estimating a extremum maximum or minimum of said performance function $f(x(t))$ based on said estimated gradient and Hessian;

outputting a command signal based on said estimated extremum to drive the plant toward the performance function extremum;

combining a persistant excitation signal in accordance with said outputted command signal; and outputting said modulated persistant excitation signal as a control signal to said plant for control thereof.

8. The computer program according to claim 7 for controlling a plant as a function of its movement in accordance with the additional step of filtering said command signal to smooth it.

9. The computer program according to claim 7, wherein said plant is an aircraft, said independent parameter is a position of said aircraft and said dependent variable is aerodynamic drag on said aircraft.

* * * * *